Patented Oct. 24, 1944

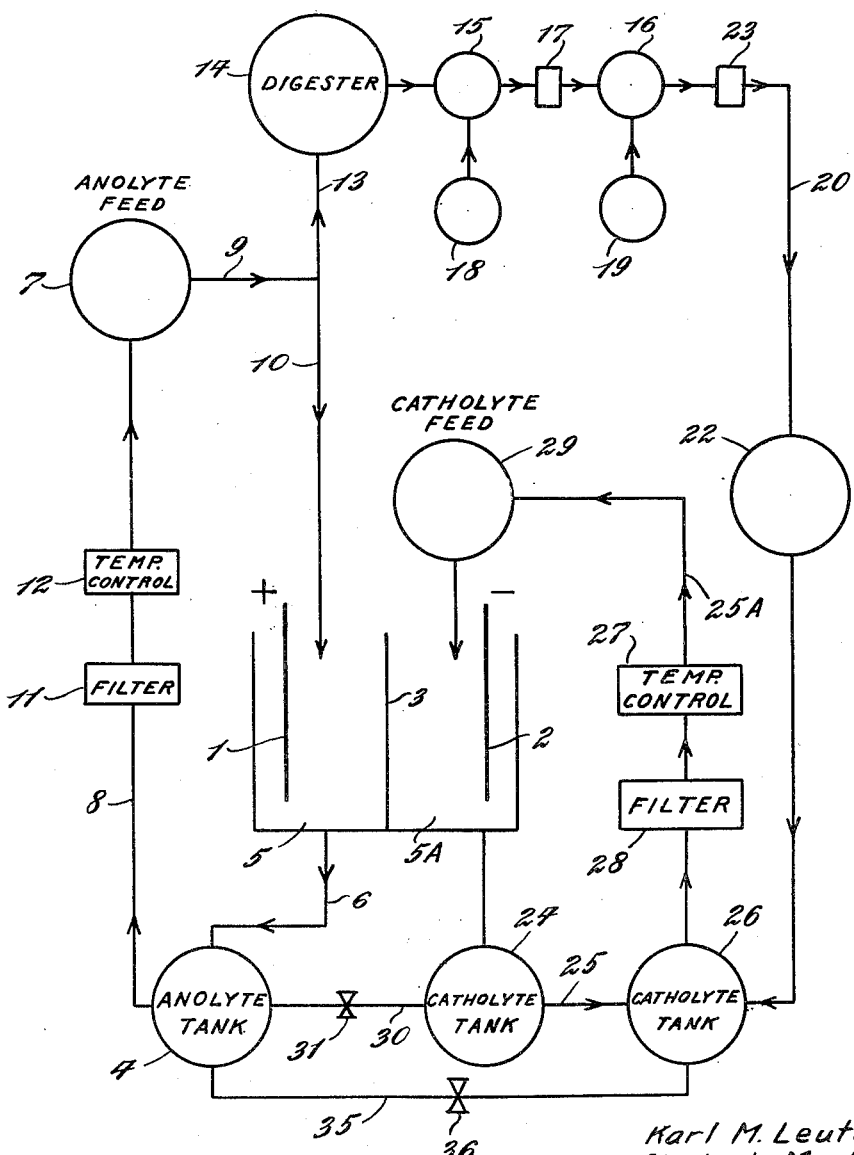

2,361,143

UNITED STATES PATENT OFFICE 2,361,143

MANGANESE DEPOSITION CONTROL

Karl M. Leute, Minneapolis, Minn., Charles L. Mantell, Manhasset, N. Y., and William L. Hammerquist, Knoxville, Tenn., assignors to Electro Manganese Corporation, Minneapolis, Minn., a corporation of Delaware Application December 28, 1940, Serial No. 372,038

20 Claims. (Cl. 204—105)

This invention relates to the electrowinning of manganese from its ores and other manganese containing substances capable of yielding a solution of manganese which may be electrolyzed.

The commercially successful electrowinning of manganese by electrolysis as compared with the old method of thermal reduction possesses advantages so important that the attainment of success is an achievement greatly to be desired. Some of the advantages are the utilization of low grade ores, low cost of production, the production of manganese in such a pure condition that its field of usefulness is greatly extended and the production of new alloys unobtainable with the less pure manganese obtained by thermal reduction.

Serious problems have however been encountered in attaining this success and it is the object of this invention to solve some of those problems.

The nature of those problems will now be described.

The principal electrolytic changes occurring in a solution of a manganese salt, e. g., manganese sulfate, are the following:

1.  $MnSO_4 = Mn^{++} + SO_4^{--}$
2.  $Mn^{++} = Mn + 2+$
3.  $HOH = H^+ + OH^-$
4.  $2H^+ = H_2 + 2+$
5.  $2OH^- = O_2 + 2H^+$
6.  $2H^+ + SO_4^{--} = H_2 + SO_4^{--}$

As shown by these equations, the manganese sulfate is split into manganese ions and sulfate ions and water is decomposed into hydrogen and hydroxyl ions. At the cathode manganese is deposited as metallic manganese in accordance with Equation 2 and hydroxyl ions (alkali) and hydrogen gas are formed according to Equations 3 and 4. At the anode hydrogen ions and oxygen are formed according to Equations 3 and 5. Thus the catholyte increases in alkalinity and the anolyte increases in acidity. Since an ammonium salt, e. g., ammonium sulfate, is desirably used as a stabilizer, alkali is also generated at the cathode in accordance with the equations $$(NH_4)_2SO_4 = 2(NH_4)^+ + SO_4^{--}$$
$$2NH_4^+ = 2NH_3 + 2H^+$$
$$2NH_3 + H_2O = 2NH_4OH$$

Since manganese will not deposit if the acid concentration is too high, it is necessary to segregate the solution at the anode from that at the cathode to prevent the acid generated at the anode from mixing with the solution at the cathode. This is done by means of a permeable membrane called a diaphragm which divides the cell into two compartments called the anolyte and catholyte, respectively.

Thus, the principal products are metallic manganese, sulfuric acid, hydrogen gas and oxygen gas. The sulfuric acid is utilized to dissolve fresh ore and remains in the electrolyte, taking part in a cycle as follows:

$$2MnO + 2H_2SO_4 = 2MnSO_4 + 2H_2O$$
$$2MnSO_4 = 2Mn^{++} + 2Mn^{++} + 2SO_4^{--}$$
$$2Mn^{++} = 2Mn + 4+$$
$$2H_2O = 2H^+ + 2OH^-$$
$$2H^+ + SO_4^{--} = H_2SO_4$$

Thus the output is metallic manganese, hydrogen and oxygen and the input is manganese ore, water and electricity. The electrolyte, as a whole, remains as a body, to which manganese oxide is added and from which metallic manganese, hydrogen and oxygen is removed. Thus input and output is shown as follows:

$$2MnO = Mn + O_2$$

The manganese ore is dissolved by acid anolyte liquid and the solution is purified as much as possible before feeding it to the cell. However it is never practically possible to remove all traces of impurities prior to introducing the solution to the cell and because the electrolyte as a whole remains as a body of liquid to which the dissolved and purified manganese is continuously added, traces of impurities build up cumulatively and by contamination of the manganese deposit, tend to thwart one of the basic purposes of the electrowinning process, i. e., the production of metallic manganese in an extremely pure condition. This is one of the problems solved by the present invention.

Prior to the present invention the process employed in an attempt to produce manganese commercially by the electrowinning method may be summarized as follows:

The electrolytic cell consisted of a series of cathodes and anodes arranged in alternate and spaced relation and separated by diaphragms thus forming a plurality of anolyte and catholyte chambers, manifolded respectively so as to provide in effect a single anolyte and a single catholyte chamber separated by a diaphragm but much more compact than such arrangement having an equivalent volume and electrode area.

In using this apparatus, the anolyte was withdrawn from its chamber and mixed with ore to generate catholyte liquid which was fed to the catholyte chamber. The catholyte liquid was permitted to overflow into the anolyte liquid. With this process and apparatus great difficulty was experienced in securing satisfactory manganese deposition over long periods of time such as are required in successful commercial operation, and the deposits were not as pure as desired.

It was discovered that during electrolysis it is of vital importance to maintain a minimum critical cathode potential drop, that the lack of uniformity in results was attended by changes in the cathode potential and that by controlling this potential, e. g., by varying the over-all voltage enough to maintain a constant cathode drop, that satisfactory deposition could be obtained, as set forth in the copending application of Charles L. Mantell, Serial No. 401,893, filed July 11, 1941, issued as Patent No. 2,286,148 on June 9, 1942.

The source of the variations in cathode drop were traced to variations in factors influencing the various resistances in the cell. Those factors include the composition and pH of the electrolyte, i. e., the anolyte and catholyte.

As above explained, the deposition of manganese at the cathode causes a depletion of the concentration of manganese salt in the catholyte and the generation of acid at the anode causes an increase of acid concentration (decrease of pH) in the anolyte. These changes cause the resistance (or conductivity) of the said electrolytes to change and consequently, when operating with a constant over-all cell voltage, changes the cathode potential since the latter is the difference between the over-all cell voltage and the voltage drops at points in the system other than at the cathode.

It has been discovered that if the concentration and pH of catholyte and anolyte are controlled within certain limits, that the resistances and potential drops of these solutions will also be controlled, that this makes possible a maintenance of the proper cathode potential at a constant over-all cell voltage and proper control of manganese deposition over the long operating periods necessitated by successful commercial operation.

It is therefore an object of the present invention to control the composition of the catholyte and anolyte within prescribed limits and to thereby control the resistances of these liquids, to make possible the attainment of satisfactory manganese deposition over long periods of time by providing means of controlling the cathode potential drop.

It is a further object to provide an improved process and means of controlling the composition of catholyte and anolyte within any desired limits.

It is a further object to avoid the contamination of the manganese deposit caused by the cumulative build-up of small proportions of impurities introduced into the electrolyte by purified manganese solutions.

In accordance with this invention the concentration of manganese in the catholyte, the pH of the catholyte and the pH of the anolyte are controlled within certain preferred prescribed limits. In addition the temperature of the catholyte and anolyte are likewise preferably controlled. This is preferably accomplished by employing recirculation of the catholyte and anolyte, respectively, as hereinafter more fully explained. Furthermore, the recirculated catholyte or anolyte or both are not only continuously recirculated but also continuously purified.

Current is passed through the electrolytes between the electrodes at a density sufficient to remove manganese from the catholyte and deposit it on the cathode at a predetermined rate in terms of grams per liter per minute, which may, for example, be from 0.25 to 2.00 grams of manganese per liter per minute. As above explained, this electrolytic deposition causes an increase in acidity in the anolyte, that is to say, the generation of hydrogen ion in the anolyte at a predetermined rate in terms of hydrogen ion per liter per minute, or expressed otherwise, a depletion of hydroxyl ions in the anolyte at a corresponding predetermined rate. At the same time the alkalinity at the cathode increases, that is to say, the pH of the catholyte increases. There are therefore three important changes which occur:

1. Loss of manganese in the catholyte;
2. Increase of pH in the catholyte;
3. Decrease of pH or increase of acid concentration in the anolyte.

In accordance with the present invention the changes in these variables are controlled within prescribed limits, as already stated, this being preferably accomplished by employing recirculation as a means to that end.

In respect to the control of concentration of manganese in the catholyte, in accordance with this invention anolyte liquid is withdrawn from the anolyte chamber, replenished with manganese and there is continuously fed to the catholyte chamber catholyte feed liquid having a predetermined maximum concentration of manganese in the form of a soluble salt thereof (which may, for example, be manganese sulfate), thus establishing a main circulation stream. As a result of electrolytic deposition of manganese from the catholyte chamber the concentration of manganese as soluble salt in the catholyte liquid decreases and there is continuously withdrawn from the catholyte chamber catholyte liquid having a lower concentration of manganese than that of the catholyte feed liquid. The concentration of manganese in the catholyte withdrawn from the catholyte chamber is then restored approximately to the concentration of manganese in the catholyte feed, this being preferably accomplished by the addition of liquid having a high concentration of manganese obtained by digesting a suitable ore or other manganese compound with anolyte liquid. The liquid withdrawn from the catholyte chamber and thus restored to the concentration of the catholyte feed liquor is then returned to the catholyte chamber, as feed liquor therefor, and is thereby recirculated in shunt-wise relation to the main circulation stream and the recirculation is effected at a rate sufficient to maintain in the liquid withdrawn from the catholyte chamber a predetermined minimum concentration of manganese. By this means the concentration of manganese in the catholyte liquid is maintained between predetermined fixed limits. This rate is dependent upon four factors:

(a) The rate of deposition of manganese;
(b) The rate of removal of catholyte liquid which may be caused by passage thereof into the anolyte liquid or withdrawal of the catholyte liquid and addition thereof to the anolyte;
(c) The concentration of the catholyte feed liquid; and
(d) The concentration of the liquid withdrawn from the catholyte chamber and recirculated.

To illustrate the relationship of these factors let it be assumed by way of example that the catholyte liquid is depleted of manganese at the rate of 2 grams per liter per minute, most of this being caused by the deposition of manganese on the cathode and the remainder by transfer of catholyte liquid to the anolyte liquid. Therefore $(a)+(b)=2$. Let it be assumed that the concentration of manganese in the liquid fed to the catholyte chamber is 35 grams of manganese per liter. Let it also be assumed that it is desired to maintain the concentration of manganese in the liquid withdrawn from the catholyte chamber at a predetermined minimum of 34 grams of manganese per liter. It will then be necessary not only to restore the concentration of manganese in the liquid withdrawn from the catholyte chamber to about 35 grams per liter but also to maintain the said recirculation at a rate of 2 liters per minute for each liter of catholyte solution. Therefore the equation to determine the rate of recirculation is as follows:

Rate of recirculation $=(a)+(b)+(c)-(d)$

From this it will be clear that as the difference between the manganese concentration in the catholyte feed liquid and the liquid withdrawn from the catholyte chamber decreases, the rate of recirculation in shunt-wise relation to the main circulation stream must correspondingly increase in accordance with said equation.

The preferred range of concentration of the manganese in the catholyte feed liquid is about 25 to 50 grams of manganese per liter in the form of a soluble salt thereof and the maximum difference in concentration between the liquids fed to and withdrawn from the catholyte chamber is about 15 grams per liter.

Applying the same principle to the control of pH in the catholyte liquid, the catholyte feed liquid is maintained at a predetermined minimum and the liquid withdrawn from the catholyte chamber necessarily has a higher pH because of the electrolytic changes occurring in said chamber. The pH of said liquid withdrawn from the catholyte chamber is then reduced to approximately that of the catholyte feed liquid and returned as feed liquid to said catholyte chamber, thereby recirculating it in shunt-wise relation to the main circulation stream, and recirculation is maintained at a rate sufficient to maintain the pH of the liquid withdrawn from the catholyte chamber at a predetermined maximum. In a typical case the liquid fed to the catholyte chamber may have a pH of about 7.2 and the pH of the liquid withdrawn from the catholyte chamber will necessarily be higher. It may be restored to approximately 7.2 by the addition thereto of anolyte liquid (having a concentration of between 1.0 and 1.2, for example) and the recirculation of the catholyte liquid in shunt-wise relation to the main circulation stream is then maintained at a rate so that the liquid withdrawn from the catholyte chamber will have a pH not exceeding, in a typical case, 7.5 to 8.3.

The preferred range of pH of the catholyte feed liquid is about 6.2 to 8.0 and the difference in the pH of the liquids fed to and withdrawn from the catholyte chamber is preferably not more than about 1.5.

When the manganese concentration is used as the criterion for the rate of recirculation of catholyte, the pH of the catholyte may be maintained within the limits named, that is, the maintenance of the manganese concentration within the limits named will also maintain the pH within the limits named, respectively.

In like manner, the pH or acid concentration in the anolyte liquid may be controlled and in accordance with the present invention there is continuously fed to the anolyte chamber anolyte liquid having a predetermined minimum concentration of hydrogen ion. There is continuously withdrawn from the anolyte chamber anolyte liquid having a hydrogen ion concentration greater than that of the liquid fed to said anolyte chamber because of the electrolytic changes occurring therein. This acid concentration is reduced to approximately that of the anolyte feed liquid. This may be done in the anolyte chamber prior to the withdrawal of anolyte liquid by transfer of catholyte liquid to the anolyte within the cell or by withdrawal of catholyte liquid from the cell and addition thereof to the recirculated anolyte liquid, or both methods of decreasing the acid concentration of the anolyte liquid may be employed. It may be pointed out here that fundamentally the source of the hydroxyl ion for accomplishing this partial neutralization or reduction in acid concentration is the ore. The ore is treated with anolyte liquid to generate catholyte liquid from which the manganese is deposited on the cathode and as a result of the chemical changes occurring in the treatment of the ore with the anolyte liquid and the electrolytic changes occurring in the catholyte chamber the catholyte liquid has an alkalinity which is utilized in this invention to control the acid concentration of the recirculated anolyte. Having changed the acid concentration of the liquid withdrawn from the anolyte chamber approximately to that of the anolyte feed the said withdrawn liquid is returned to the anolyte chamber and thereby recirculated in shunt-wise relation to the main circulation stream and the recirculation is maintained at a rate which is sufficient to maintain in the liquid withdrawn from the anolyte chamber a predetermined maximum acid concentration or minimum pH. This provides a means of maintaining the acid concentration of the anolyte liquid within predetermined fixed limits and in a typical case these limits may be within the range of from 1.0 to 1.2.

The preferred acid concentration of the anolyte feed liquid corresponds to about 1.0 to 2.0 and the maximum preferred difference in the pH of the liquid fed to and withdrawn from the anolyte chamber is about 1.0.

It is desirable also in many cases to control the temperature of the recirculated catholyte and anolyte liquid and said recirculation makes it possible to effect a very close temperature control, as for example, by introducing heat exchangers or other suitable control devices in the recirculation circuits.

As stated at the beginning, one of the great advantages of manganese electrowinning is the production of manganese in extremely pure form. In accordance with the present invention the catholyte liquid is generated by treating a suitable conditioned ore or other manganese compound with anolyte liquid and the catholyte liquid so generated is then subjected to a high degree of purification before use so as to free it from impurities including metals other than manganese, which would tend to contaminate the deposit and produce undesirable electrolytic effects.

In accordance with the present invention not only is this extensive purification effected before it is used, but there is also provided means for continuous purification of the catholyte liquid as a result of the recirculation. Even though the catholyte liquid is extensively purified before use, impurities are nevertheless inevitably introduced and the introduction of these impurities is cumulative because substantially nothing is removed from the cell except deposited manganese and the volatile products of electrolysis. Therefore, although the catholyte liquid may be extensively purified before use substantial concentrations of impurities necessarily build up during the long periods of time which are desirable in successful commercial operation of manganese electrowinning processes.

The present invention provides means to prevent this occurrence and in accordance therewith continuous purification of the catholyte is effected. This may be accomplished by interposing a suitable device such as a filter in the recirculation circuit to remove impurities which may have separated in suspended form as a result of electrolytic changes. In some cases, if desired, the recirculated catholyte liquid may be submitted to treatment with chemical agents to effect the precipitation of soluble impurities.

Not only may the catholyte be continuously purified but similar purification methods may be applied to the recirculated anolyte.

The principles of the invention will be defined in the claims ultimately appended hereto and will be further described and illustrated by the following description taken in conjunction with the accompanying drawing showing diagrammatically a form of apparatus which may be employed to practice the process of the invention.

The cell for the electrowinning of manganese is shown diagrammatically as provided with an anode 1 and a cathode 2 separated by a diaphragm 3. In practice the cell is provided with a series of cathodes and anodes arranged alternately in a row, each cathode and anode being separated by a diaphragm. The cathodes and anodes are, respectively, electrically connected in parallel and supplied with current at a density sufficient to accomplish the desired rate of manganese deposition. The tank 4 provides a means for accumulating anolyte liquid withdrawn from the anolyte chamber 5 through the line 6, and the tank 7 serves as a source of anolyte feed liquid. Lines 8, 9 and 10 are provided for the recirculation of anolyte liquid. In the line 8 there may be interposed a filter or other purification device 11 and a heat exchanger or other temperature control device 12. Line 13 is provided to divert a portion of the anolyte liquid to a digester 14. Suitable pumps are provided to afford the necessary recirculation and movement of liquid. The digester 14 provides means for mixing anolyte liquid with a suitable conditioned manganese ore or other suitable source of manganese. Tanks 15 and 16 provide means of effecting successive purification of the catholyte liquid produced in the digester and a filter 17 is interposed between these tanks. Tanks 18 and 19 provide sources of the necessary reagents for effecting these purifications. A line 20 conveys purified catholyte liquid from the second purification tank 16 to a catholyte feed storage tank 22 and in this line there is interposed a filter 23. Tank 24 serves to accumulate catholyte liquid withdrawn from the catholyte chamber 5A. Line 25 is provided to convey catholyte liquid from tank 24 to a catholyte adjustment tank 26. Line 25A is provided to convey liquid from catholyte adjustment tank 26 to catholyte feed tank 29 and in this line filter 28 and temperature control device 27 are interposed. Tank 29 serves as an accumulator for catholyte feed liquid to be fed to the catholyte chamber 5A. It will be understood that the necessary pumps are provided for the recirculation and conveyance of liquids as shown and described. Line 30, provided with valve 31, enables catholyte from tank 24 to be added to anolyte in tank 4 and line 35 provided with valve 36 enables anolyte from tank 4 to be added to catholyte in tank 26.

The following description will serve as an illustration of one of the numerous embodiments of the process of the invention. The cell is provided with catholyte containing 35 grams per liter of manganese as manganese sulfate or other soluble salt of manganese and 150 grams per liter of ammonium sulfate or other ammonium salt and with anolyte having a concentration of 5 to 15 grams of manganese per liter as manganese sulfate or other solid salt of manganese and 150 grams per liter of ammonium sulfate or other ammonium salt. The pH of the catholyte is adjusted to about 7.2 and that of the anolyte to about 1.2. The temperature of the catholyte and anolyte is adjusted to about 32° C.

Current is passed through the anolyte and catholyte at a density sufficient to deposit manganese on the cathode at a rate of about 2 grams of manganese per liter per minute. This may be accomplished by a current density of 32 amperes per square foot at the cathode and 120 amperes per square foot at the anode. Anolyte is continuously withdrawn from the chamber 5 and recirculated in shunt-wise relation to the main circulation stream through line 6, tank 4, line 8, filter 11, temperature control device 12, inlet feed tank 7, lines 9 and 10 and is fed to the anolyte chamber continuously at a pH of 1.2. Catholyte liquid from the chamber 5A is mixed with the anolyte liquid so that the acid concentration of the anolyte liquid in the anolyte tank 4 is restored to about 1.2 to compensate for the increase in acidity caused by electrolytic changes in the anolyte chamber. This addition of catholyte liquid to anolyte may occur by passing catholyte through the said line 30 provided with valve 31. The recirculation of the anolyte liquid from the anolyte tank 4 through lines 8, 9 and 10 is then maintained at a rate sufficient to maintain in the anolyte liquid withdrawn through the line 6 a pH not less than about 0.8 to 1.0.

A portion of the recirculated anolyte liquid is diverted through the line 13 mixed in a digester 14 with a suitable ore, e. g., rodocrosite, which is a manganese carbonate ore. The insoluble material is settled out and the supernatant liquid, which is an impure manganese sulfate solution containing iron, cobalt, arsenic and nickel among the impurities and having a pH of about 5, is delivered to the first purification tank 15 where it is treated with lime and blown with air to precipitate iron in the form of ferric hydroxide. The precipitate is removed in filter 17 and the filtrate treated in the second purification tank 16 with ammonium sulfide from the tank 19 to precipitate nickel and cobalt as sulfide which are removed in the filter 23 from which the filtrate passes through the line 20 to the manganese feed storage tank 22. The proportions of anolyte liquid and ore used in the digester and the concentrations and proportions of the purifying reagents are so adjusted as to produce in the feed storage tank 22 a purified solution containing preferably, manganese sulfate having a concentration, for example, of 30 to 80 grams of manganese as manganese sulfate, per liter, a preferred range being 35 to 60.

From the catholyte feed tank 29 catholyte liquid is continuously fed to the catholyte chamber, said liquid having a concentration of manganese, as manganese sulfate, of about 35 grams per liter and a pH of about 7.2. Catholyte liquid is continuously withdrawn to the catholyte tank 24 and as a result of electrolytic changes occurring in the catholyte liquid the concentration of manganese therein is less than that of the catholyte feed and the pH is greater than that of the catholyte feed. The liquid so withdrawn is passed to the catholyte adjustment tank 26 where the concentration of manganese is increased by additions from the tank 22, to about 35 grams of manganese as manganese sulfate, per liter, and the pH is reduced by additions of anolyte liquid from the tank 4 to about 7.2. The catholyte liquid, thus adjusted, is then passed through filter 26 to remove insoluble impurities or precipitates, then through temperature control device 27 to control the temperature to about 32° C., then to catholyte feed tank 29 and thence to the catholyte chamber and is thus recirculated in shunt-wise relation to the main circulation stream, and this recirculation is maintained at the rate of 2 liters per minute. By this means the concentration of manganese in the liquid withdrawn from the catholyte chamber is maintained at about 34 grams per liter. At the same time this rate of recirculation will maintain a pH in the liquid withdrawn from the catholyte chamber of 7.5 to 8.3.

The removal of insoluble impurities or precipitates from the anolyte and catholyte, respectively, can occur continuously or intermittently by means of the filters 11 and 26 or other suitable purification devices, and is of substantial value in maintaining the purity of the electrolytes and the purity of the manganese deposit.

The over-all cell voltage is adjusted to provide a cathode drop of not less than 1.46 to 1.50 volts as measured by any suitable potentiometric measuring device. Having fixed the said over-all voltage and the cathode potential drop and having also fixed, in accordance with the present invention, the pH and composition of the catholyte and anolyte and the temperature thereof within the prescribed limits, it will be found that the critical cathode potential drop will be maintained at not less than the values stated and a satisfactory manganese deposition will occur over long periods of time.

What we claim is:

1. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the concentration of manganese salt in the catholyte liquid which comprises passing current through the anolyte and catholyte electrolyte at a density sufficient to remove manganese from the catholyte and deposit it on the cathode at a predetermined rate in terms of grams per liter per minute; continuously feeding, to the catholyte chamber, catholyte feed liquid having a predetermined maximum concentration of manganese in the form of a soluble salt thereof; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid to the catholyte chamber and thereby recirculating it in shunt-wise relation to the main circulation stream, and maintaining the recirculation at a rate sufficient to maintain in the liquid withdrawn from the catholyte chamber a predetermined minimum concentration of manganese.

2. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the concentration of manganese salt in the catholyte liquid which comprises passing current through the anolyte and catholyte electrolyte at a density sufficient to remove manganese from the catholyte and deposit it on the cathode at a predetermined rate in terms of grams per liter per minute; continuously feeding, to the catholyte chamber, catholyte feed liquid having a predetermined maximum concentration of manganese in the form of manganese sulfate; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid to the catholyte chamber and thereby recirculating it in shunt-wise relation to the main circulation stream, and maintaining the recirculation at a rate sufficient to maintain in the liquid withdrawn from the catholyte chamber a predetermined minimum concentration of manganese.

3. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the concentration of manganese salt in the catholyte liquid which comprises passing current through the anolyte and catholyte at a density sufficient to remove manganese from the catholyte and deposit it on the cathode at a rate of about 0.25 to 2.00 grams per liter per minute; continuously feeding, to the catholyte chamber, catholyte feed liquid having a predetermined maximum concentration of manganese in the form of a soluble salt thereof; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid to the catholyte chamber and thereby recirculating it in shunt-wise relation to the main circulation stream, and maintaining the recirculation at a rate sufficient to maintain in the liquid withdrawn from the catholyte chamber a predetermined minimum concentration of manganese.

4. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganesee therein and addition of said replenished electrolyte to the catholyte chamber thus establishing a main circulation stream of electrolyte, the method of controlling the concentration of manganese salt in the catholyte liquid which comprises passing current through the anolyte and catholyte at a density sufficient to remove manganese from the catholyte and deposit it on the cathode at a rate of about 0.25 to 2.00 grams per liter per minute; continuously feeding, to the catholyte chamber, catholyte feed liquid having a predetermined maximum concentration of manganese in the form of manganese sulfate; continuously withdrawing, from the catholyte chamber, catholyte liquid having less manganese per liter than the liquid fed to said chamber; restoring the concentration of manganese in said withdrawn liquid to about that of the feed liquid by the addition of replenished electrolyte from the main circulation stream; returning said withdrawn liquid to the catholyte chamber and thereby recirculating it in shunt-wise relation to the main circulation stream, and maintaining the recirculation at a rate sufficient to maintain in the liquid withdrawn from the catholyte chamber a predetermined minimum concentration of manganese.

5. A method of controlling the concentration of manganese salt in the catholyte liquid, which comprises passing current through the anolyte and catholyte at a density sufficient to remove manganese from the catholyte and deposit it on the cathode at a rate of about 0.25 to 2.00 grams per liter per minute; continuously feeding, to the catholyte chamber, catholyte feed liquid having a maximum concentration of about 25 to 50 grams of manganese in the form of a soluble salt thereof; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid to the catholyte chamber and thereby recirculating it in shunt-wise relation to the main circulation stream, and maintaining the recirculation at a rate sufficient to maintain in the liquid withdrawn from the catholyte chamber a predetermined minimum concentration of manganese, the difference in concentration of manganese in the liquids fed to and withdrawn from the catholyte chamber, respectively, being not more than about 15 grams of manganese per liter.

6. A method of controlling the concentration of manganese salt in the catholyte liquid, which comprises passing current through the anolyte and catholyte at a density sufficient to remove manganese from the catholyte and deposit it on the cathode at a rate of about 0.25 to 2.00 grams per liter per minute; continuously feeding, to the catholyte chamber, catholyte feed liquid having a maximum concentration of about 25 to 50 grams of manganese in the form of manganese sulfate; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid to the catholyte chamber and thereby recirculating it in shunt-wise relation to the main circulation stream, and maintaining the recirculation at a rate sufficient to maintain in the liquid withdrawn from the catholyte chamber a predetermined minimum concentration of manganese, the difference in concentration of manganese in the liquids fed to and withdrawn from the catholyte chamber, respectively, being not more than about 15 grams of manganese per liter.

7. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the concentration of acid in the anolyte liquid which comprises passing current through the anolyte and catholyte at a density sufficient to generate hydrogen ion in the anolyte at a predetermined rate in terms of grams of hydrogen ion per liter per minute; continuously feeding to the anolyte chamber anolyte feed liquid having a predetermined minimum acid concentration; continuously withdrawing from the anolyte chamber anolyte liquid having a concentration of hydrogen ion greater than that of the liquid fed to said anolyte chamber; reducing the concentration of acid in said anolyte liquid to about that of the feed liquid; returning said withdrawn liquid having said reduced acid concentration to the anolyte chamber and thereby recirculating it in shunt-wise relation to the main circulation stream; and maintaining the recirculation of the anolyte liquid at a rate sufficient to maintain in the liquid withdrawn from the anolyte chamber a predetermined maximum acid concentration.

8. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the concentration of acid in the anolyte liquid which comprises passing current through the anolyte and catholyte at a density sufficient to generate hydrogen ion in the anolyte at a predetermined rate in terms of grams of hydrogen ion per liter per minute; continuously feeding to the anolyte chamber anolyte feed liquid having a minimum acid concentration corresponding to a pH of about 1.0 to 2.0; continuously withdrawing from the anolyte chamber anolyte liquid having an acid concentration greater than that of the liquid fed to said anolyte chamber; reducing the concentration of acid in said anolyte liquid to about that of the feed liquid; returning said withdrawn liquid having said reduced acid concentration to the anolyte chamber and thereby recirculating it in shunt-wise relation to the main circulation stream; and maintaining the recirculation of the anolyte liquid at a rate sufficient to maintain in the liquid withdrawn from the anolyte chamber a predetermined maximum acid concentration, the difference in the pH of the liquids fed to and withdrawn from the anolyte chamber being not greater than about 1.0.

9. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the concentration of acid in the anolyte liquid which comprises passing current through the anolyte and catholyte at a density sufficient to generate hydrogen ion in the anolyte at a predetermined rate in terms of grams of hydrogen ion per liter per minute; continuously feeding to the anolyte chamber anolyte feed liquid having a predetermined minimum acid concentration; diverting a portion of said anolyte liquid; mixing said diverted anolyte liquid with a manganese compound soluble therein to generate catholyte liquid whereby the acid in the anolyte liquid is neutralized, the pH thereof increased and the concentration of manganese increased; continuously withdrawing from the anolyte chamber anolyte liquid having an acid concentration greater than that of the liquid fed to said anolyte chamber; reducing the concentration of acid in said anolyte liquid to about that of the feed liquid by the addition thereto of catholyte liquid; returning said withdrawn liquid having said reduced acid concentration to the anolyte chamber and thereby recirculating it in shunt-wise relation to the main circulation stream, and maintaining the recirculation of the anolyte liquid at a rate sufficient to maintain in the liquid withdrawn from the anolyte chamber a predetermined maximum acid concentration.

10. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the concentration of acid in the anolyte liquid which comprises passing current through the anolyte and catholyte at a density sufficient to generate hydrogen ion in the anolyte at a predetermined rate in terms of grams of hydrogen ion per liter per minute; continuously feeding to the anolyte chamber anolyte feed liquid having a minimum acid concentration corresponding to a pH of about 1.0 to 2.0; diverting a portion of said anolyte liquid; mixing said diverted anolyte liquid with a manganese compound soluble therein to generate catholyte liquid whereby the acid in the anolyte liquid is neutralized, the pH thereof increased and the concentration of manganese increased; continuously withdrawing from the anolyte chamber anolyte liquid having an acid concentration greater than that of the liquid fed to said anolyte chamber; reducing the concentration of acid in said anolyte liquid to about that of the feed liquid by the addition thereto of catholyte liquid; returning said withdrawn liquid having said reduced acid concentration to the anolyte chamber and thereby recirculating it in shunt-wise relation to the main circulation stream, and maintaining the recirculation of the anolyte liquid at a rate sufficient to maintain in the liquid withdrawn from the anolyte chamber a predetermined maximum acid concentration, the difference in the pH of the liquids fed to and withdrawn from the anolyte chamber being not greater than about 1.0.

11. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the pH in the catholyte liquid which comprises passing current through the anolyte and catholyte at a density sufficient to remove manganese from the catholyte and deposit it on the cathode at a predetermined rate in terms of grams per liter per minute as a result of which the pH of the catholyte is increased; continuously feeding to the catholyte chamber catholyte feed liquid having a predetermined pH; continuously withdrawing from the catholyte chamber catholyte liquid having a higher pH than that of the liquid fed to said chamber; reducing the pH in said withdrawn catholyte liquid to about that of the feed liquid; returning said withdrawn liquid having said reduced pH to the catholyte chamber and thereby recirculating it in shunt-wise relation to the main circulation stream, and maintaining the recirculation of said catholyte liquid at a rate sufficient to maintain in the liquid withdrawn from the catholyte chamber a predetermined maximum pH.

12. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the pH in the catholyte liquid which comprises passing current through the anolyte and catholyte at a density sufficient to remove manganese from the catholyte and deposit it on the cathode at a predetermined rate in terms of grams per liter per minute as a result of which the pH of the catholyte is increased; continuously feeding to the catholyte chamber catholyte feed liquid having a predetermined pH; continuously withdrawing from the catholyte chamber catholyte liquid having a higher pH than that of the liquid fed to said chamber; reducing the pH in said withdrawn catholyte liquid to about that of the feed liquid by adding anolyte liquid thereto; returning said withdrawn liquid having said reduced pH to the catholyte chamber and thereby recirculating it in shunt-wise relation to the main circulation stream, and maintaining the recirculation of said catholyte liquid at a rate sufficient to maintain in the liquid withdrawn from the catholyte chamber a predetermined maximum pH.

13. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the pH in the catholyte liquid which comprises passing current through the anolyte and catholyte at a density sufficient to remove manganese from the catholyte and deposit it on the cathode at a predetermined rate in terms of grams per liter per minute as a result of which the pH of the catholyte is increased; continuously feeding to the catholyte chamber catholyte feed liquid having a predetermined pH of about 6.2 to 8.0; continuously withdrawing from the catholyte chamber catholyte liquid having a higher pH than that of the liquid fed to said chamber; reducing the pH in said withdrawn catholyte liquid to about that of the feed liquid; returning said withdrawn liquid having said reduced pH to the catholyte chamber and thereby recirculating it in shunt-wise relation to the main circulation stream, and maintaining the recirculation of said catholyte liquid at a rate sufficient to maintain in the liquid withdrawn from the catholyte chamber a predetermined maximum pH, the difference in the pH of the liquid fed to and withdrawn from the catholyte chamber being not more than about 1.5.

14. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the pH in the catholyte liquid which comprises passing current through the anolyte and catholyte at a density sufficient to remove manganese from the catholyte and deposit it on the cathode at a predetermined rate in terms of grams per liter per minute as a result of which the pH of the catholyte is increased; continuously feeding to the catholyte chamber catholyte feed liquid having a pH of about 6.2 to 8.0; continuously withdrawing from the catholyte chamber catholyte liquid having a higher pH than that of the liquid fed to said chamber; reducing the pH in said withdrawn catholyte liquid to about that of the feed liquid by adding anolyte liquid thereto; returning said withdrawn liquid having said reduced pH to the catholyte chamber and thereby recirculating it in shunt-wise relation to the main circulation stream, and maintaining the recirculation of said catholyte liquid at a rate sufficient to maintain in the liquid withdrawn from the catholyte chamber a predetermined maximum pH, the difference in the pH of the liquid fed to and withdrawn from the catholyte chamber being not more than about 1.5.

15. In a cyclic process for the electrowinning of managanese employing an electrolytic cell divided into catholyte and anolyte chambers containing catholyte and anolyte, respectively, said cyclic process comprising the withdrawal of anolyte liquid from the anolyte chamber, replenishment of managanese therein and addition of said replenished electrolyte to the catholyte chamber thus establishing a main circulation stream of electrolyte, the method of controlling the composition and acid concentration of the electrolytes which comprises passing current through the anolyte and catholyte at a density sufficient to remove managanese from the catholyte and deposit it on the cathode at a predetermined rate in terms of grams of manganese per liter per minute; continuously feeding to the catholyte chamber catholyte feed liquid having a predetermined maximum concentration of manganese in the form of a soluble salt thereof; continuously withdrawing, from the catholyte chamber, catholyte liquid having less manganese per liter than the liquid fed to said chamber; restoring the concentration of manganese in said withdrawn liquid to about that of the feed liquid; returning said withdrawal liquid and thereby recirculating it in shunt-wise relation to the main circulation stream; maintaining the recirculation at a rate sufficient to maintain in the liquid withdrawn from the catholyte chamber a predetermined minimum concentration of manganese; continuously feeding to the anolyte chamber anolyte feed liquid having a predetermined minimum acid concentration; continuously withdrawing from the anolyte chamber anolyte liquid having an acid concentration greater than that of the liquid fed to said anolyte chamber; reducing the concentration of acid in said anolyte liquid to about that of the feed liquid; returning said withdrawn liquid having said reduced acid concentration to the anolyte chamber and thereby recirculating it separately from the main circulation stream, and maintaining the recirculation of the anolyte liquid at a rate sufficient to maintain in the liquid withdrawn from the anolyte chamber a predetermined maximum acid concentration.

16. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the composition and acid concentration of the electrolytes which comprises passing current through the anolyte and catholyte at a density sufficient to remove manganese from the catholyte and deposit it on the cathode at a rate of about 0.25 to 2.00 grams of manganese per liter per minute; continuously feeding to the catholyte chamber catholyte feed liquid having a predetermined maximum concentration of about 25 to 50 grams of manganese in the form of manganese sulfate; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid and thereby recirculating it in shunt-wise relation to the main circulation stream; maintaining the recirculation at a rate sufficient to maintain in the liquid withdrawn from the catholyte chamber a predetermined minimum concentration of manganese, the difference in concentration of manganese in the liquids fed to and withdrawn from the catholyte chamber, respectively, being not more than about 15 grams of manganese per liter; continuously feeding to the anolyte chamber anolyte feed liquid having a minimum acid concentration corresponding to a pH of about 1.0 to 2.0; continuously withdrawing from the anolyte chamber anolyte liquid having an acid concentration greater than that of the liquid fed to said anolyte chamber; reducing the concentration of acid in acid anolyte liquid to about that of the feed liquid; returning said withdrawn liquid having said reduced acid concentration to the anolyte chamber and thereby recirculating it separately from the main circulation stream, and maintaining the recirculation of the anolyte liquid at a rate sufficient to maintain in the liquid withdrawn from the anolyte chamber a predetermined maximum acid concentration, the difference in the pH of the liquids fed to and withdrawn from the anolyte chamber being not greater than about 1.0.

17. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the composition and acid concentration of the electrolytes which comprises passing current through the anolyte and catholyte at a density sufficient to remove manganese from the catholyte and deposit it on the cathode at a predetermined rate in terms of grams of manganese per liter per minute; continuously feeding to the catholyte chamber catholyte feed liquid having a predetermined maximum concentration of manganese in the form of a soluble salt thereof; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid and thereby recirculating it in shunt-wise relation to the main circulation stream; maintaining the recirculation at a rate sufficient to maintain in the liquid withdrawn from the catholyte chamber a predetermined minimum concentration of manganese; continuously feeding to the anolyte chamber anolyte feed liquid having a predetermined minimum acid concentration; diverting a portion of said anolyte liquid; mixing said diverted anolyte liquid with a manganese compound soluble therein to generate catholyte feed liquid whereby the acid in the anolyte liquid is neutralized, the pH thereof increased and the concentration of manganese increased; continuously withdrawing from the anolyte chamber anolyte liquid having an acid concentration greater than that of the liquid fed to said anolyte chamber; reducing the concentration of acid in said anolyte liquid to about that of the feed liquid; returning said withdrawn liquid having said reduced acid concentraton to the anolyte chamber and thereby recirculating it separately from the main circulation stream, and maintaining the recirculation of the anolyte liquid at a rate sufficient to maintain in the liquid withdrawn from the anolyte chamber a predetermined maximum acid concentration.

18. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the composition and acid concentration of the electrolytes which comprises passing current through the anolyte and catholyte at a density sufficient to remove manganese from the catholyte and deposit it on the cathode at a rate of about 0.25 to 2.00 grams of manganese per liter per minute; continuously feeding to the catholyte chamber catholyte feed liquid having a predetermined maximum concentration of about 25 to 50 grams of manganese in the form of manganese sulfate; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid and thereby recirculating it in shunt-wise relation to the main circulation stream; maintaining the recirculation at a rate sufficient to maintain in the liquid withdrawn from the catholyte chamber a predetermined minimum concentration of manganese, the difference in concentration of manganese in the liquids fed to and withdrawn from the catholyte chamber, respectively, being not greater than about 15 grams of manganese per liter; continuously feeding to the anolyte chamber anolyte feed liquid having a minimum acid concentration corresponding to a pH of about 1.0 to 2.0; diverting a portion of said anolyte liquid; mixing said diverted anolyte liquid with a manganese compound soluble therein to generate catholyte feed liquid whereby the acid in the anolyte liquid is neutralized, the pH thereof increased and the concentration of manganese increased; continuously withdrawing from the anolyte chamber anolyte liquid having an acid concentration greater than that of the liquid fed to said anolyte chamber; reducing the concentration of acid in said anolyte liquid to about that of the feed liquid; returning said withdrawn liquid having said reduced acid concentration to the anolyte chamber and thereby recirculating it separately from the main circulation stream, and maintaining the recirculation of the anolyte liquid at a rate sufficient to maintain in the liquid withdrawn from the anolyte chamber a predetermined maximum acid concentration, the difference in the pH of the liquids fed to and withdrawn from the anolyte chamber being not more than about 1.0.

19. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the composition and acid concentration of the electrolytes which comprises passing current through the anolyte and catholyte at a density sufficient to remove manganese from the catholyte and deposit it on the cathode at a predetermined rate in terms of grams of manganese per liter per minute; continuously feeding to the catholyte chamber catholyte feed liquid having a predetermined maximum concentration of manganese in the form of a soluble salt thereof; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid and thereby recirculating it in shunt-wise relation to the main circulation stream; maintaining the recirculation at a rate sufficient to maintain in the liquid withdrawn from the catholyte chamber a predetermined minimum concentration of manganese; removing insoluble impurities from the recirculated liquid; continuously feeding to the anolyte chamber anolyte feed liquid having a predetermined minimum acid concentration; diverting a portion of said anolyte liquid; mixing said diverted anolyte liquid with a manganese compound soluble therein to generate catholyte feed liquid whereby the acid in the anolyte liquid is neutralized, the pH thereof increased and the concentration of manganese increased; continuously withdrawing from the anolyte chamber anolyte liquid having an acid concentration greater than that of the liquid fed to said anolyte chamber; reducing the concentration of acid in said anolyte liquid to about that of the feed liquid by the addition of catholyte; returning said withdrawn liquid having said reduced acid concentration to the anolyte chamber and thereby recirculating it separately from the main circulation stream, and maintaining the recirculation of the anolyte liquid at a rate sufficient to maintain in the liquid withdrawn from the anolyte chamber a predetermined maximum.

20. In a cyclic process for the electrowinning of manganese employing an electrolytic cell divided into catholyte and anolyte chambers containing catholyte and anolyte, respectively, said cyclic process comprising the withdrawal of anolyte liquid from the anolyte chamber, replenishment of manganese therein and addition of said replenished electrolyte to the catholyte chamber thus establishing a main circulation stream of electrolyte, the method of controlling the composition and acid concentration of the electrolytes which comprises passing current through the anolyte and catholyte at a density sufficient to remove manganese from the catholyte and deposit it on the cathode at a predetermined rate in terms of grams of manganese per liter per minute; continuously feeding to the catholyte chamber catholyte feed liquid having a predetermined maximum concentration of manganese in the form of a soluble salt thereof; continuously withdrawing, from the catholyte chamber, catholyte liquid having less manganese per liter than the liquid fed to said chamber; restoring the concentration of manganese in said withdrawn liquid to about that of the feed liquid; returning said withdrawn liquid and thereby recirculating it in shunt-wise relation to the main circulation stream; maintaining the recirculation at a rate sufficient to maintain in the liquid withdrawn from the catholyte chamber a predetermined minimum concentration of manganese; continuously feeding to the anolyte chamber anolyte feed liquid having a predetermined minimum acid concentration; diverting a portion of said anolyte liquid; mixing said diverted anolyte liquid with a manganese compound soluble therein to generate catholyte liquid whereby the acid in the anolyte liquid is neutralized, the pH thereof increased and the concentration of manganese increased; continuously withdrawing from the anolyte chamber anolyte liquid having an acid concentration greater than that of the liquid fed to said anolyte chamber; reducing the concentration of acid in said anolyte liquid to about that of the feed liquid by the addition of catholyte; returning said withdrawn liquid having said reduced acid concentration to the anolyte chamber and thereby recirculating it separately from the main circulation stream; removing insoluble impurities from the recirculated liquid, and maintaining the recirculation of the anolyte liquid at a rate sufficient to maintain in the liquid withdrawn from the anolyte chamber a predetermined maximum.

KARL M. LEUTE.
CHARLES L. MANTELL.
WILLIAM L. HAMMERQUIST.